United States Patent

Golwalkar et al.

(10) Patent No.: US 9,282,151 B2
(45) Date of Patent: Mar. 8, 2016

(54) FLOW CONTROL IN A DISTRIBUTED ENVIRONMENT

(75) Inventors: Yogesh Vilas Golwalkar, Pune (IN); Kristin Marie Hazlewood, Austin, TX (US); John Ryan McGarvey, Apex, NC (US); Magesh Rajamani, Pune (IN)

(73) Assignee: International Business Machines Corporation, Armonk, NY (US)

( * ) Notice: Subject to any disclaimer, the term of this patent is extended or adjusted under 35 U.S.C. 154(b) by 1724 days.

(21) Appl. No.: 12/208,500

(22) Filed: Sep. 11, 2008

(65) Prior Publication Data

US 2010/0061233 A1    Mar. 11, 2010

(51) Int. Cl.
  *G01R 31/08*  (2006.01)
  *H04L 29/08*  (2006.01)

(52) U.S. Cl.
  CPC ............... *H04L 67/14* (2013.01); *H04L 67/10* (2013.01)

(58) Field of Classification Search
  USPC ............. 370/230, 395, 203, 228, 241, 248, 370/351–357, 368, 395.1, 395.2, 395.4, 370/395.43, 395.6, 395.61, 395.63, 395.65, 370/397, 399, 467–469
  See application file for complete search history.

(56) References Cited

U.S. PATENT DOCUMENTS

| | | | |
|---|---|---|---|
| 5,857,188 A * | 1/1999 | Douglas ........................... 707/9 |
| 6,212,164 B1 * | 4/2001 | Murakami et al. ............ 370/230 |
| 6,282,424 B1 * | 8/2001 | Wright et al. ................. 455/450 |
| 6,330,226 B1 * | 12/2001 | Chapman et al. ............. 370/232 |
| 6,338,089 B1 * | 1/2002 | Quinlan ........................ 709/227 |
| 6,424,992 B2 * | 7/2002 | Devarakonda et al. ....... 709/203 |
| 6,799,276 B1 * | 9/2004 | Belissent ........................ 726/14 |
| 6,816,910 B1 * | 11/2004 | Ricciulli ....................... 709/237 |
| 6,968,389 B1 * | 11/2005 | Menditto et al. ............. 709/233 |
| 7,376,741 B1 * | 5/2008 | Carter et al. .................. 709/228 |
| 2001/0047392 A1 * | 11/2001 | Murphy, Jr. et al. ......... 709/208 |
| 2002/0055982 A1 * | 5/2002 | Goddard ....................... 709/217 |
| 2003/0084159 A1 | 5/2003 | Blewett |
| 2004/0122953 A1 * | 6/2004 | Kalmuk et al. ............... 709/227 |
| 2005/0052994 A1 | 3/2005 | Lee |
| 2005/0165932 A1 * | 7/2005 | Banerjee et al. .............. 709/226 |
| 2005/0188101 A1 | 8/2005 | Ludwig et al. |
| 2005/0220020 A1 | 10/2005 | Qureshi et al. |
| 2006/0045008 A1 | 3/2006 | Sun et al. |
| 2006/0282537 A1 * | 12/2006 | Venkatsubra et al. ........ 709/228 |
| 2007/0067428 A1 * | 3/2007 | Ogawa et al. ................. 709/223 |
| 2007/0094388 A1 * | 4/2007 | Talanis et al. ................. 709/224 |

* cited by examiner

*Primary Examiner* — Jung-Jen Liu
(74) *Attorney, Agent, or Firm* — Yee & Associates, P.C.; William J. Stock (57) ABSTRACT

A computer implemented method, apparatus, and computer program product for managing requests. Responsive to receiving a request from a client, a determination is made as to whether a connection within a pool of connections has a set of outstanding requests for the client to handle a previous request from the same client. Responsive to a determination that the connection has any outstanding request, a determination is made as to whether a set of requests queued for the connection is equal to or exceeds a threshold. Responsive to a determination that the set of outstanding requests is equal to or exceeds the threshold, subsequent requests from the client are unprocessed until the set of outstanding requests becomes less than the threshold.

12 Claims, 4 Drawing Sheets

FLOW CONTROL IN A DISTRIBUTED ENVIRONMENT

BACKGROUND OF THE INVENTION

1. Field of the Invention

The present invention relates generally to an improved data processing system and more specifically to a method and apparatus for processing data. Still more particularly, the present invention relates to a computer implemented method, apparatus, and computer usable program product for managing requests in a network data processing system.

2. Description of the Related Art

The Internet, also referred to as art "internetwork", is a set of computer networks, possibly dissimilar, joined together by means of gateways that handle data transfer and the conversion of messages from a protocol used by the sending network to a protocol used by the receiving network. When capitalized, the term "Internet" refers to a collection of networks and gateways that use the TCP/IP suite of protocols. The Internet may carry information and provide services. The information and services include, for example, electronic mail, online chat services, file transfers, web pages, and other resources.

The Internet is a commonly used source of information and entertainment. Further, the Internet is also used as a medium for business activities. Additionally, many businesses, government entities, and other organizations have a presence on the Internet using Websites to perform various transactions. Various organisations may offer goods and services using the Internet. These goods and services may involve a sale of goods that are to be shipped to a customer. The goods may be software and/or data purchased by a customer and transferred over the Internet to the customer. The World Wide Web is a commonly used system for these types of activities. The World Wide Web is a system of interlinked hypertext documents that may be accessed through the Internet.

In this type of environment, a single server or multiple servers may handle requests. The request may be, for example, for a file, a connection, a webpage, or some other resource. In a distributed computing environment, a proxy server may handle these requests and forward them to other servers. When a request is received from a client, a proxy server creates an inbound request, connects to a server from a set of servers, and sends the inbound request on behalf of the client.

BRIEF SUMMARY OF THE INVENTION

The illustrative embodiments provide a computer implemented method, apparatus, and computer program product for managing requests. Responsive to receiving a request from a client, a determination is made as to whether a connection within a pool of connections has a set of outstanding requests for the client to handle a previous request from the same client. Responsive to a determination that the connection has any outstanding request, a determination is made as to whether a set of requests queued for the connection is equal to or exceeds a threshold. Responsive to a determination that the set of outstanding requests is equal to or exceeds the threshold, subsequent requests from the client are unprocessed until the set of outstanding requests becomes less than the threshold.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium or media may be utilised. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programing language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams, of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
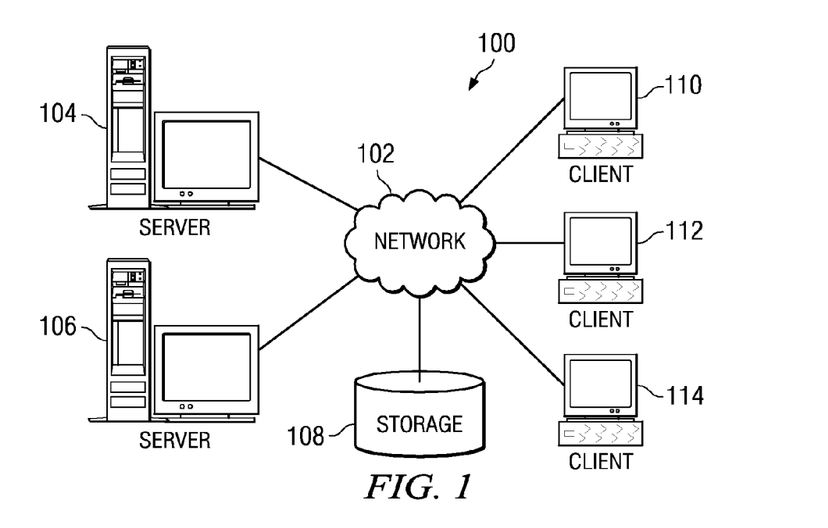
FIG. 1 is a pictorial representation of a network of data processing systems in which illustrative embodiments may be implemented.
Figure 2:
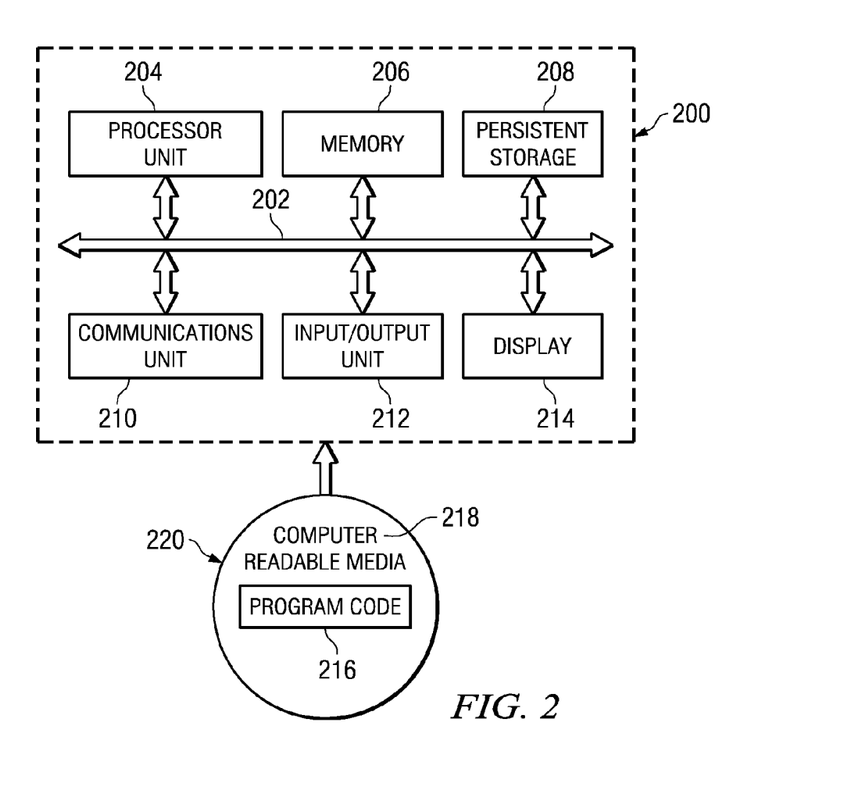
FIG. 2 is a block diagram of a data processing system in which illustrative embodiments may be implemented.

With reference now to the Figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which, illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depleted example, server 104 provides data, such as boot files, operating system images, and applications to clients 110, 112, and 114. Clients 110, 112, and 114 are clients to server 104 in this example. In the different illustrative embodiments, a server such as server 106 may function as a proxy server to handle requests from clients and for those requests to other servers such as server 104. The different illustrative embodiments may be implemented in software and/or hardware in a proxy server. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that mute data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent, basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash, memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data, processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments recognize that proxy servers currently read requests as quickly as the requests are received. This type of reading and processing of requests occurs regardless of the number of requests that have already been queued for a particular connection. In a distributed networking environment, a proxy server reads an inbound request and then places the inbound request into a queue for a connection within a pool of connections. Each of these connections leads to a server that processes requests. This type of server is referred to as a backend server.

The illustrative embodiments recognize that if requests are received or placed into queues for connections faster than the servers can process the requests, the proxy server queues more and more requests until the proxy server runs out of memory or storage for the request. Further, the different illustrative embodiments also recognize that requests targeting a particular server are typically sent through a connection having the least number of pending requests. With this type of situation, however, the different illustrative embodiments recognize that a second client sending a quick request immediately after a long running request from a first client may result in the quick request being stuck behind the long running request in the same backend queue. The different illustrative embodiments recognize that since requests are sent to a connection with the least number of pending requests, it is possible that consecutive requests from the same client may end up being queued to different connections. This type of queuing of requests to different connections may cause those requests to be handled in a parallel fashion by the backend server.

As a result the different illustrative embodiments recognize that if a second request has any dependencies on the first request, the second request may fail if processed at the same time or prior to the first request. An example of this type of situation is a second request adding a child of the entry added in a first request.

Thus, the different illustrative embodiments provide a computer implemented, method, apparatus, and computer program product for managing the processing of requests. In response to receiving a request from a client, a determination is made as to whether a connection within the pool of connections is serving an outstanding request from the client. If a connection is already serving an outstanding request from the client, that connection will continue to be used for the same client. When a connection has art outstanding request from the client, the connection may have additional outstanding requests. The fact that one outstanding request is present may be used to send additional requests from the client to the same connection. Further, a determination is made as to whether a set of requests queued in the connection exceeds the threshold. A set of items, as used herein, refers to one or more items.

For example, a set of requests is one or more requests. If the set of requests exceeds the threshold, subsequent requests are unprocessed from the client until the set of requests becomes less than the threshold. By not processing requests, the client may be able to continue to send requests until a buffer becomes full. In other advantageous embodiments, the unprocessed requests may actually be refused in not processing the requests, depending on the particular implementation. The set of requests may become less than the threshold when the set of requests is less than some selected number. In this manner, the set of requests may become less than the threshold if the set of requests is one less than the threshold, in one example. In other examples, the set of requests may become less than the threshold if the set of requests is three less than the threshold value. Once the set of requests falls below the threshold, a request may be read from a buffer and/or a socket for processing.

Figure 3:
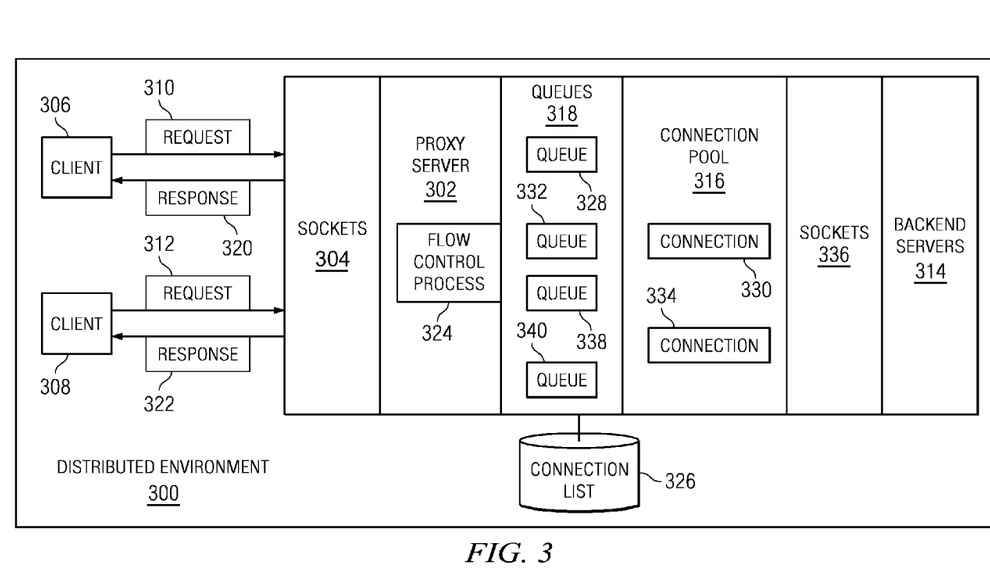
FIG. 3 is a block diagram illustrating flow control in a distributed environment in accordance with an advantageous environment.

With reference now to FIG. 3, a block diagram illustrating flow control in a distributed environment is depicted in accordance with an advantageous environment. In this example, distributed environment 300 is an example of an environment that may be implemented using a data processing system, such as, for example, network data processing system 100 in FIG. 1. Proxy server 302 is an example of a process that may execute on a data processing system, such as, for example, data processing system 200 in FIG. 2.

Proxy server 302 may use sockets 304 to exchange information with clients, such as, for example, client 306 and client 308. Proxy server 302 may receive requests, such as, for example, request 310 and request 312, by reading sockets 304. In these examples, a socket within sockets 304 is an end point of a bidirectional process to process communication and flow across an Internet Protocol based network. Each socket within sockets 304 is mapped to an application process rethreading in these examples.

In response to reading request 310 and request 312, proxy server 302 may send request 310 and request 312 to one or more backend servers in backend servers 314, using connection pool 316. More specifically, request 310 and request 312 may be placed into a queue within queues 318. Each queue within queues 318 is associated with a connection within connection pool 316. Connection pool 316 is a set of connections to backend servers 314.

In these examples, each connection within connection pool 316 provides a mechanism to transmit data in which proxy server 302 has one end point for each connection and a server within backend server 314 is another end point for the connection. These connections are established before data is sent, and data is sent over the same path during the communication. This type of connection guarantees that data arrives in the proper sequence. Backend servers 314 handle request 310 and request 312 when they are received through connection pool 316.

These requests are processed and responses are sent back to proxy server 302 across connection pool 316. In response to receiving these responses, proxy server 302 returns response 320 and response 322 to client 306 and client 308, respectively.

In the different illustrative embodiments, proxy server 302 includes flow control process 324. Flow control process 324 identifies clients that have outstanding requests in a connection within connection pool 316. In these examples, an outstanding request is a request that has been read from a socket or buffer but has not yet been completely processed. In order to be completely processed, the request must be sent to the backend server, the response to the request must be retrieved from the backend server, and the response data must be written to an outbound socket or buffer for transmission to the client. When the response data is written in its entirety to the outbound socket or buffer, the request is no longer outstanding, as it has been completed.

For example, when client 306 sends request 310, flow control process 324 checks connection list 326 to determine whether client 306 has an outstanding request in a connection in connection pool 316 for processing in backend servers 314. In this example, client 306 has an outstanding request, and the connection that will be used may be identified in connection list 326. Request 310 is then placed into queue 328, within queues 318, for the same identified connection within connection pool 316. In this example, the connection to be used is connection 330.

In this illustrative example, client 308 has not previously sent a request to proxy server 302. As a result, flow control process 324 identifies queue 332, within queues 318, as having no outstanding requests. Request 312 is then placed into queue 332 within queues 318. Connection 334 in connection pool 316 is associated with queue 332. Connection 334 is identified and an entry is placed into connection list 326 identifying client 308 and connection 334 within connection pool 316. This information may later be used to route additional requests from client 308 to the same connection, connection 334, within connection pool 316.

In this example, since client 306 has previously sent a request that has not yet been processed using connection 330, flow control process 324 determines whether the number of such outstanding requests within queue 328 exceeds a threshold. If the number of outstanding requests within queue 328 equals or exceeds the threshold, then request 310 is added to queue 328. However, no additional requests from client 306 are processed. In other words, flow control process 324 does not read any requests that may be sent in a connection from client 306. More specifically, the TCP/IP connection with client 306 for receiving its request and sending responses is not read. Eventually, client 306 may have to wait when the buffer on the client side becomes full. At that point, client 306 is unable to make any additional requests. This refusal may be performed by not reading the socket within sockets 304 associated within client 306. This status may be placed into or flagged in connection list 326.

No further requests are received from client 306 until the number of requests in queue 328 falls below the threshold. The requests fall below the threshold, in these examples, if the number of requests within queue 328 is less than the threshold by some selected number of requests. For example, the requests within queue 328 may be below the threshold if the number of requests is one less than the threshold. In other examples, the number of requests in queue 328 may be below the threshold if the number of requests is five less than the threshold. Of course, the particular number of requests needed to be considered below the threshold may vary depending on the particular implementation.

For another example, if no free connections are present in connection pool 316 to service request 312, flow control process 324 may wait to read any requests from any clients until a free connection is present in connection pool 316. This type of suspension of reading requests may be performed by not reading any sockets within sockets 304.

In this example, when responses to requests from clients are ready in backend servers 314, sockets 336 is read, responses are queued to queues 318 in connections in connection pool 316 identified for corresponding clients, responses are written back to those same identified connections, and responses are then sent to clients through proxy server 312. For example, a response to request 310 for client 306 is read through a socket within sockets 336 and is then queued to queue 338 in connection 330. This response is then sent as response 320 to client 306. In another example, response 322 in backend servers 314 is read through sockets 334, queued in queue 340 in connection 334, and sent to client 308 in a similar manner to response 320.

The illustration of distributed environment 300 in FIG. 3 is provided for purposes of illustrating various features of the different illustrative embodiments. This illustration is not meant to imply physical or architectural limitations in a manner in which different illustrative embodiments may be implemented. For example, connection list 326 may take various forms. For example, connection list 326 may be a flat file, a linked list, a table, a database, or some other suitable architecture or data structure for holding data. In yet other illustrative embodiments, distributed environment 300 may include an additional proxy server, in addition to proxy server 302, to handle connections within connection pool 316 for backend servers 314.

Figure 4:
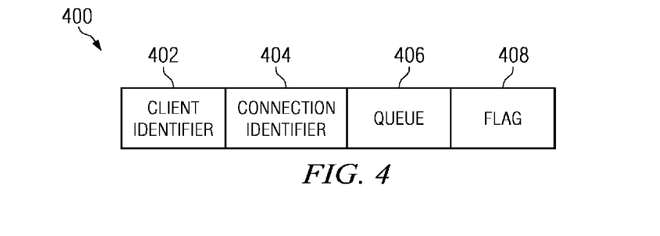
FIG. 4 is an illustration of an entry in a connection list in accordance with an illustrative embodiment.

With reference now to FIG. 4, an illustration of an entry in a connection list is depicted in accordance with an illustrative embodiment. In this example, entry 400 is an example of au entry that may be found in connection list 326 in FIG. 3. Entry 400 includes client identifier 402, connection identifier 404, queue 406, and flag 408.

Client identifier 402 identifies the client, while connection identifier 404 identifies the particular connection in the connection pool. Client identifier 402 may be, for example, an Internet Protocol (IP) address of a client. Connection identifier 404 may be, for example, a simple counter number that is unique within the server. Queue 406 identifies a queue that is associated with the connection identified by connection identifier 404. The queue identified in queue 406 is a queue used to hold requests that are to be sent for processing using the connection identified by connection identifier 404. Flag 408 identifies whether the socket for the particular client in sockets 304 in FIG. 3 should be read. Flag 408 may be set to not read a particular socket for a client when a queue associated with the client has a number of requests equal to or greater than some threshold.

Figure 5:
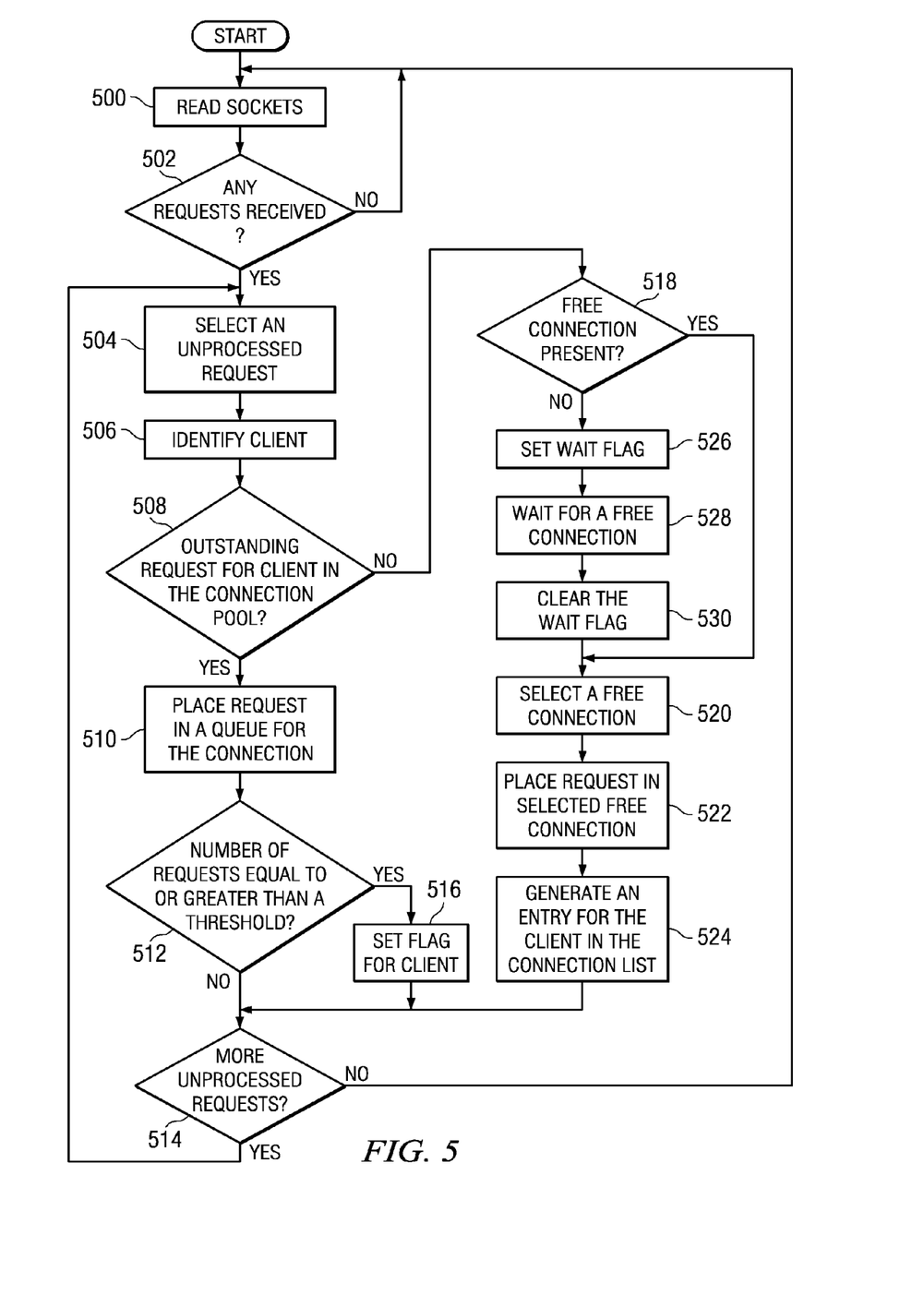
FIG. 5 is a flowchart of a process for managing requests in accordance with an illustrative embodiment.

With reference now to FIG. 5, a flowchart of a process for managing requests is depicted in accordance with an illustrative embodiment. The process illustrated in FIG. 5 may be implemented in a software component, such as, for example, flow control process 324 within proxy server 302 in FIG. 3.

The process begins by reading sockets (step 500). In step 500, only sockets with unset flags are read. Any sockets with flags that are set are not read, in these examples. The setting of a flag indicates that the particular client associated with the socket should be ignored.

Next, a determination is made as to whether any requests have been received (step 502). If no requests have been received, the process returns to step 500. Otherwise, the process selects an unprocessed request (step 504). The client for the selected request is identified (step 500). This client may be identified from the request in these examples. A determination is made as to whether a connection in the connection pool has an outstanding request for the same client (step 508).

If a connection in the connection pool has an outstanding request for the client, this same connection is again used for the client. The process places the request in a queue for the connection (step 510). A determination is then made as to whether the number of requests in the queue is equal to or greater than the threshold (step 512).

If the number of requests in the queue is not equal to or greater than the threshold, the process determines whether additional unprocessed requests are present (step 514). If additional unprocessed requests are not present, the process returns to step 500. Otherwise, the process continues on to step 504 as described above.

In these examples, a maximum number of requests for a threshold may be configured to a value that is proportional to a parameter or set of parameters. These parameters may include, for example, average backend server response time, network round trip latency, and/or the proxy dispatching latency. The value may be set as, for example, 1+(network roundtrip latency+proxy dispatching latency)/network roundtrip latency. The result of this equation may be set to this threshold value but may never be less than 2. In other advantageous embodiments, the threshold may be user configured by an administrator.

With reference again to step 512, if a number of requests is equal to or greater than the threshold, a flag is set (step 516), with the process then proceeding to step 514 as described above. In step 516, the setting of the flag means that further requests from the client will be unprocessed. In these examples, the requests are unprocessed because the process does not read requests sent by client. The flag may be set in association with a socket such that the socket is not read when the process reads the sockets or a flag may be set for all sockets such that no socket read operation will be performed. This flag is referred to as a wait flag.

With reference again to step 508, if a connection in the connection pool for the client does not have an outstanding request for the client, a determination is made as to whether a free connection is present (step 518). In these examples, a free connection is present if a queue in a set of queues has no requests and is empty. If a free connection is present, the process selects a free connection (step 520). The process then places a request in the selected free connection (step 522). Next, the process generates an entry for the client in a connection list (step 524), with the process then proceeding to step 514 as described above.

With reference again to step 518, if a free connection is not present, the process then sets a wait flag (step 526), with the process then proceeding to wait for a free connection to become available (step 538). When a free connection becomes available, the wait flag is cleared (step 530), and the process returns to step 520 as described above.

Figure 6:
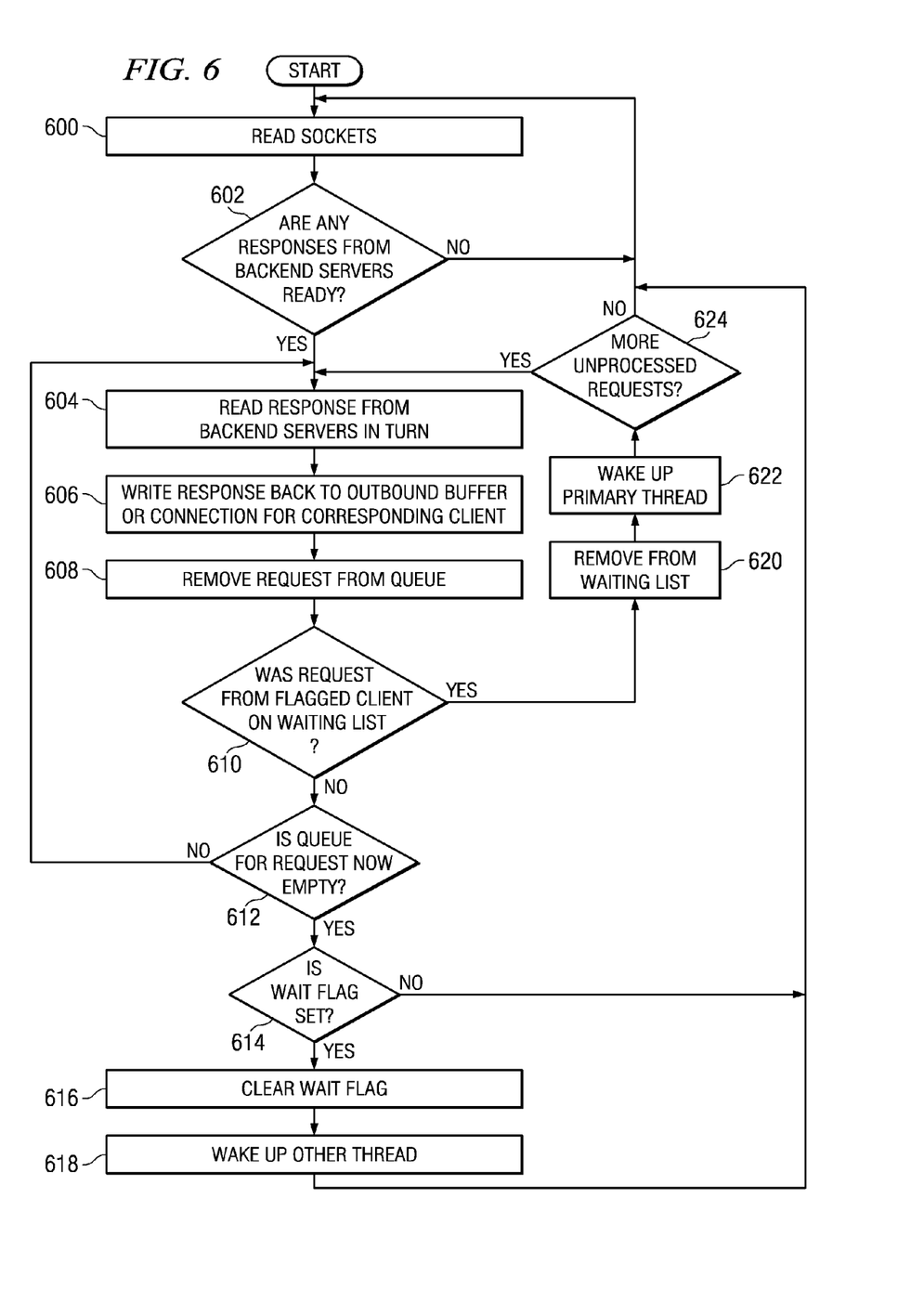
FIG. 6 is a flowchart of a process for managing responses in accordance with an illustrative embodiment.

With reference now to FIG. 6, a flowchart of a process for managing responses is depicted in accordance with an illustrative embodiment. The process illustrated in FIG. 6 may be implemented in a software component, such as, for example, flow control process 324 in proxy server 302 in FIG. 3.

The process begins by reading sockets (step 600). Then, the process determines whether any of the responses from the backend servers are ready (step 602). If a response from the backend servers is not ready, the process returns to step 600 as described above. Otherwise, if a response from the backend servers is ready, the process reads the response from the backend servers in turn (step 604). Reading responses from the backend servers in turn may be performed by reading the responses in some selected order or sequence. For example, without limitation, the selected order or sequence may be a numbered order of queues, a numbered order of sockets, an order based on the date and time a request is received, or some other selected order or sequence. The process then writes the response back to an outbound buffer or a connection for a corresponding client (step 606).

Next, the process removes the request from the queue (step 608). After step 608, a determination is made as to whether the request was from a flagged client on a waiting list (step 610). A flagged client is any client in which a flag has been set to indicate that further requests from the client will be unprocessed. If the request was from a flagged client on a waiting list, the process removes the request from the waiting list (step 620). The process then wakes up the primary thread (step 622). At this point, the process determines whether there are any additional unprocessed requests are present (step 624). If additional unprocessed requests are present, the process continues on to step 604 as described above. Otherwise, the process returns to step 600 as described above.

With reference again to step 610, if the request was not from a flagged client on a waiting list, the process then determines whether the queue for the request is now empty (step 612). If the queue is indeed empty, the process then determines whether a wait flag is set (step 614). If a wait flag is set, the process then clears the wait flag (step 616) and continues on to wake up the other thread (step 618). After step 618, the process then continues on to step 624 as described above.

With reference again to step 614, if a wait flag is not set, the process then continues directly to step 624 as described above. With reference again to step 612, if the queue for the request is not empty, the process returns to step 604 as described above.

Thus, the different illustrative embodiments provide a computer implemented method, apparatus, and computer usable program code for managing requests. In particular, the process may be used to manage the flow of requests within a distributed environment. In response to receiving a request from a client, a determination is made as to whether a connection within the pool of connections has been previously used to handle a previous request from the client. If the connection has been previously used, a determination is made as to whether a set of requests queued for the connection is equal to or exceeds a threshold. If the set of requests is equal to or exceeds the threshold, subsequent requests from the client are refused until the set of requests becomes less than the threshold.

With these and other features in the illustrative embodiments, an avoidance of parallel processing of requests and failed processing of requests due to dependencies may be avoided. Further, the different advantageous embodiments also provide a capability to manage the processing of requests such that requests may be refused for some clients or from all clients, depending on the number of requests in queues and/or the number of free connections.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "composing," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the an without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing requests, the computer implemented method comprising:
    responsive to receiving a request from a client, determining whether a connection within a pool of connections has an outstanding request from the client;
    responsive to a determination that the connection has the outstanding request, determining whether a set of requests queued for the connection is equal to or exceeds a threshold;
    responsive to a determination that the set of requests is equal to or exceeds the threshold, failing to process subsequent requests from the client until the set of requests becomes less than the threshold;
    responsive to a determination that the connection with the outstanding request is absent, placing the request in a queue for a free connection;
    responsive to the determination that the connection with the outstanding request is absent, determining whether a free connection is present to handle the connection; and
    responsive to a determination that the free connection is absent, failing to read any additional requests from all clients until the free connection becomes available, wherein the step of failing to read any additional requests from all clients until the free connection becomes available comprises:
    setting a wait flag, wherein the wait flag results in sockets to the client remaining unread;
    waiting for the free connection to become available; and
    responsive to the free connection becoming available, clearing the wait flag.

2. The computer implemented method of claim 1, wherein the failing step comprises:
    failing to perform a socket read operation for the client to read for further requests.

3. The computer implemented method of claim 1, wherein the set of requests becomes less than a threshold when the set of requests is less than the threshold by a selected number.

4. The computer implemented method of claim 2, wherein the step of failing to perform a socket read operation for the client to read for further requests comprises:
    setting a flag for the client.

5. An apparatus comprising:
    a bus;
    a storage device connected to the bus, wherein program code is stored on the storage device;
    a processor unit connected to the bus, wherein the processor unit executes the program code to determine whether a connection within a pool of connections has an outstanding request from the client in response to receiving a request from a client; determine whether a set of requests queued for the connection is equal to or exceeds a threshold in response to a determination that the connection has the outstanding request; fail to process subsequent requests from the client until the set of requests becomes less than the threshold in response to a determination that the set of requests is equal to or exceeds the threshold; place the request in a queue for a free connection in response to a determination that the connection with the outstanding request is absent; determine whether a free connection is present to handle the connection in response to the determination that the connection with the outstanding request is absent; and fail to read any additional requests from all clients until the free connection becomes available in response to a determination that the free connection is absent, wherein in executing the program code step to fail to read any additional requests from all clients until the free connection becomes available, the processor unit executes the program code to set a wait flag, wherein the wait flag results in sockets to the client remaining unread; wait for the free connection to become available; and clear the wait flag in response to the free connection becoming available.

6. The apparatus of claim 5, wherein in executing the program code to fail to process subsequent requests from the client until the set of requests becomes less than the threshold in response to a determination that the set of requests is equal to or exceeds the threshold, the processor unit executes the program code to fail to perform a socket read operation for the client to read for further requests.

7. The apparatus of claim 5, wherein the set of requests becomes less than a threshold when the set of requests is less than the threshold by a selected number.

8. The apparatus of claim 5 further comprising:
    a plurality of backend servers capable of handling requests; and
    a proxy server capable of receiving requests from a number of clients, wherein program code is program code for the proxy server.

9. A computer program product comprising a computer recordable storage medium having computer usable program code stored thereon, which when executed by a computer, performs steps of:
    responsive to receiving a request from a client, determining whether a connection within a pool of connections has an outstanding request from the client;
    responsive to a determination that the connection has the outstanding request, determining whether a set of requests queued for the connection is equal to or exceeds a threshold;
    responsive to a determination that the set of requests is equal to or exceeds the threshold, failing to process subsequent requests from the client until the set of requests becomes less than the threshold;
    responsive to a determination that the connection with the outstanding request is absent, placing the request in a queue for a free connection;
    responsive to the determination that the connection with the outstanding request is absent, determining whether a free connection is present to handle the connection; and
    responsive to a determination that the free connection is absent, failing to read any additional requests from all clients until the free connection becomes available, wherein the step of failing to read any additional requests from all clients until the free connection becomes available comprises:
    setting a wait flag, wherein the wait flag results in sockets to the client remaining unread;
    waiting for the free connection to become available; and
    responsive to the free connection becoming available, clearing the wait flag.

10. The computer program product of claim 9, wherein responsive to a determination that the set of requests is equal to or exceeds the threshold, for failing to process subsequent requests from the client until the set of requests becomes less than the threshold comprises:

failing to perform a socket read operation for the client to read for further requests.

11. The computer program product of claim 9, wherein the computer usable program code is downloaded over a network from a remote data processing system.

12. The computer program product of claim 9, wherein the computer usable program code is downloaded over a network from a remote data processing system for use in a computer readable storage medium with the remote system.

\* \* \* \* \*